United States Patent [19]

Kragh

[11] 4,318,772

[45] Mar. 9, 1982

[54] SATURATED LIQUOR COOLING TOWER

[76] Inventor: Loren G. Kragh, 28903 8th Ave. South, Federal Way, Wash. 98003

[21] Appl. No.: 67,042

[22] Filed: Aug. 16, 1979

Related U.S. Application Data

[63] Continuation-in-part of Ser. No. 789,449, Apr. 20, 1979, abandoned, which is a continuation-in-part of Ser. No. 381,340, Jul. 20, 1973, Pat. No. 4,019,951.

[51] Int. Cl.$^3$ .............................................. B01D 1/18
[52] U.S. Cl. ................................. 159/45; 159/48 R; 159/4 CC; 23/301; 422/245
[58] Field of Search .................. 159/45, 47, 16, 4 CC, 159/4 R, 48 R; 422/245; 23/301

[56] References Cited

U.S. PATENT DOCUMENTS

| | | | |
|---|---|---|---|
| 1,814,300 | 7/1931 | Duschak | 23/301 R |
| 2,375,922 | 5/1945 | Jeremiassen | 159/45 |
| 2,887,723 | 5/1959 | Hallie et al. | 23/301 R |
| 3,094,133 | 6/1963 | Treanor | 165/DIG. 1 |
| 3,459,509 | 8/1969 | Aoyama | 23/273 R |
| 3,510,266 | 5/1970 | Midler, Jr. | 23/273 R |
| 3,599,701 | 8/1971 | Mollerstedt et al. | 159/45 |
| 3,607,141 | 9/1971 | Montagna et al. | 23/301 R |
| 3,635,042 | 1/1972 | Spangemacher | 261/DIG. 11 |
| 3,638,708 | 2/1972 | Farin | 159/4 A X |
| 3,865,911 | 2/1975 | Lefevre | 165/4 A X |

Primary Examiner—Norman Yudkoff
Attorney, Agent, or Firm—Richard W. Hanes

[57] ABSTRACT

The invention is method and apparatus for removing dissolved solids from water by creating a condition of super-saturation of the solids material within a confined water circuit, propagating the formation of solids by a process of crystal nucleation and crystal growth and separating the crystallized solids. The invention also involves the apparatus for carrying out the process including a continuous process circuit for circulating a super-saturated liquor, which circuit comprises a source of heat energy for propelling the process and a cooling tower to provide evaporation and super-saturation, and further including a separator to remove crystallized solids from the liquor.

5 Claims, 1 Drawing Figure

U.S. Patent
Mar. 9, 1982
4,318,772
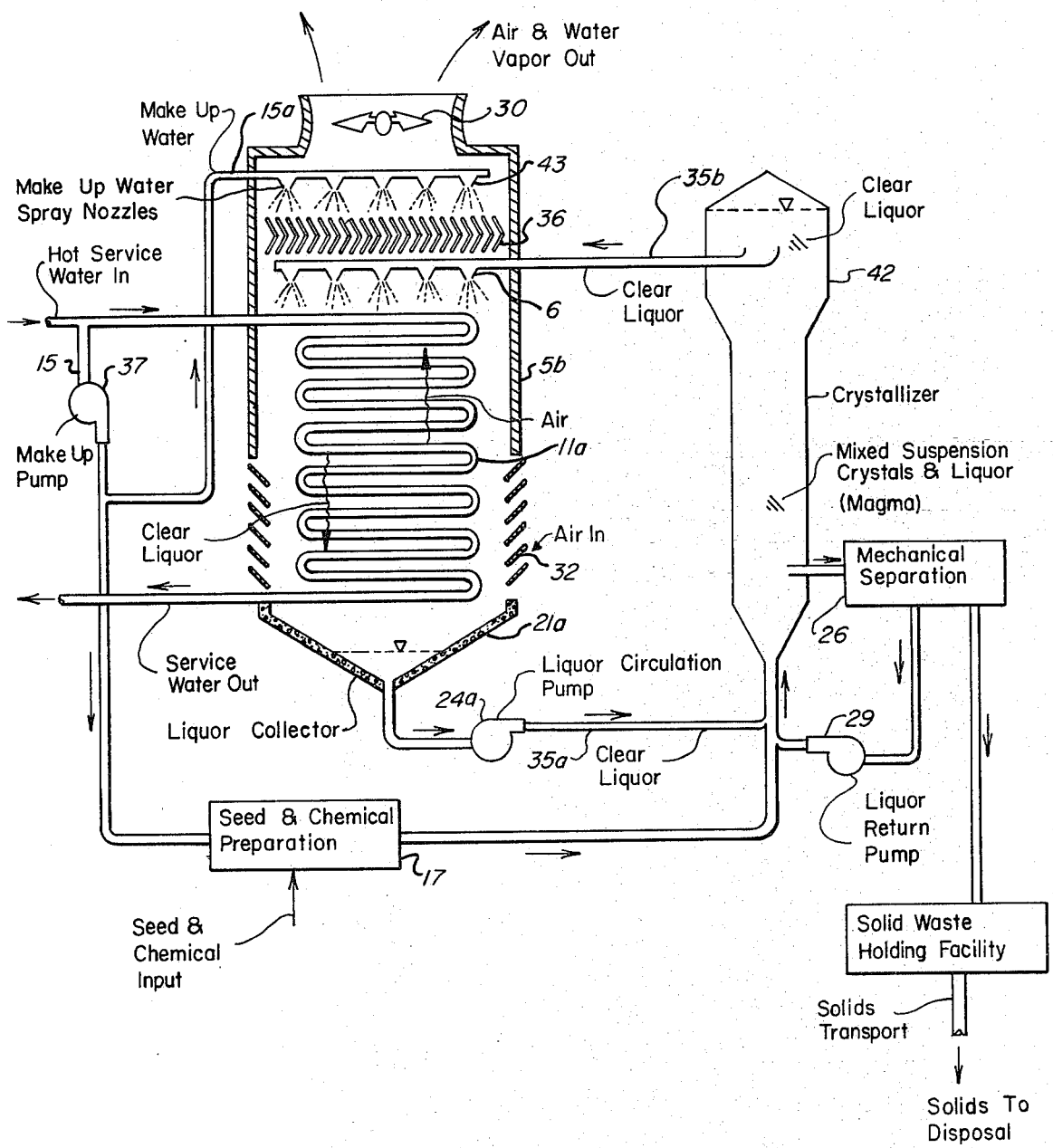

SATURATED LIQUOR COOLING TOWER

This application is a continuation-in-part of my copending Application, Ser. No. 789,449, Apr. 20, 1977, now abandoned, which is a continuation-in-part of an Application Ser. No. 381,340, July 20, 1973, U.S. Pat. No. 4,019,951.

BACKGROUND OF THE INVENTION

Environmental and conservation considerations have focused new attention on the existing ways and means of disposing of waste heat from large industrial installations such as power plants. A modern steam turbine electric power plant has a thermal efficiency of only about forty percent, meaning that sixty percent of the heat energy put into the system has to be eliminated as waste. In the majority of such plants, the heat is removed by drawing water from a stream or a lake or even a body of salt water, running it through the plant once and then returning the heated water to its source. This type of cooling is becoming less acceptable as questions arise about the adequacy of cooling water supplies and about the biological effects of warming natural bodies of water.

Two well-known alternatives to the "once through" cooling method are in common use. These are the "wet" and "dry" cooling tower systems. In the dry system, heat is exchanged from the service water to air. While air is a perfectly good coolant, hugh volumes of the gas must be moved and elaborate heat exchange surfaces must be provided in order to cool a large plant effectively. The initial cost of such a system is high.

A more practical alternative is the "wet" cooling tower, where both air and water serve as coolants. In such a tower, the service water being circulated through the plant comes in intimate contact with circulating air and heat is carried away, mostly through the process of evaporation. The rest of the water is collected at the bottom of the tower and returned to the system to perform its function in the steam condenser system where the water again is heated. Because the tower cooling is mainly evaporative, part of the service water circulating through the system is lost. The rule of thumb is one percent of evaporation loss for each ten degrees fahrenheit of cooling.

There are two other sources of water loss; the first is drift, meaning water that is carried away from the tower as very fine droplets suspended in the air leave the tower. The second source of loss results from the need to constantly bleed off part of the water and dispose of it in order to maintain a substantially fixed level of dissolved solids in the water. Without the bleed off, or "blowdown", as it is called in the art, the evaporative loss of water causes increasingly higher concentrations of dissolved solids in the remaining water. The addition of "make up" water to replace that lost by evaporation and drift does not sufficiently dilute the high concentrations of dissolved solids to prevent the solids from reaching or surpassing a level of saturation and then fouling the tower by forming scale on parts of the system and thus interfering with its operation. It becomes necessary to actually remove from the system some of the water with high dissolved solids concentration and add more make up water to keep the system operational with a level of dissolved solids that can be tolerated which must be below saturation. Blowdown water may amount to 3 percent of the total system service water for each ten degrees fahrenheit of cooling achieved by the tower.

The need for the blowdown process creates two significant problems. The first problem is that of disposing of the blowdown water, which, by definition, is polluted with a high concentration of dissolved solids. The second problem is one of water conservation. Although drift losses require make up, this portion of the total loss is relatively small, usually not exceeding 0.2 percent of the total water circulated in a well designed tower. The sum of the losses, however, including the loss due to blowdown, is significant in a large cooling tower. For example, in a modern 680,000 kilowatt generating plant, the amount of water circulated through the tower units under average summer conditions would be about 345 million gallons per day and the requirement for make up would be about 6.5 million gallons per day, a considerable portion of which could be saved if the blowdown operation were not required.

Therefore, it is the primary object of this invention to eliminate the requirement for liquid waste blowdown in a wet cooling tower operation by providing a method and means for removing the dissolved solids from the service water in a solid crystalline form.

A second object of the invention is to conserve fresh water resources by providing a method and means for effective use of make up water in a heat rejecting system whereby the quality of the make up water is not important; that is, low quality or industrial waste water having total dissolved solids approaching saturation or having noxious dissolved or suspended solids would be acceptable into the system.

A third and important object of the invention is to utilize heretofore wasted heat energy for a socially valuable function, i.e. the disposal of polluted water.

A further object of the invention is to resolve environmental issues that delay and obstruct the construction of industrial and power plants by providing apparatus which will meet ultimate environmental requirements of no liquid waste discharge and no thermal pollution. This same object may be met by providing additional industrial plant siting alternatives.

A further object of the invention is to provide means for removing dissolved solids from cooling tower water where a substantial part of the cost thereof is chargeable to the waste heat rejection function and the dissolved solids removal cost is minimal.

An additional specific object of the invention is to provide means that can function either as a conventional cooling tower with conventional controls and water chemistry or as both a cooling tower and a remover of dissolved solids from service water.

Another object of the invention is to provide means for economic recovery from water of commodity chemicals.

A further object of the invention is to provide a means of water pollution abatement which allows the employment of many different water treatment chemicals since the waste water is not discharged.

A still further object of the invention is to provide a means of water pollution abatement capable of removing selected dissolved solids by adding chemicals to the waste water to develop insoluable compounds which are precipitated out of solution and then mechanically separated.

Another object of the invention is to provide a means for disposal of liquid waste water produced by water reclamation and purification processes, such as ion exchange, reverse osmosis, electrodialysis, multistage flash and vapor compression.

Although the prior art has practiced many methods for the removal of dissolved solids from large quantities of water, such methods have not been noteworthy for their success, either economic or substantive. Some of these methods have included processes of reverse osmosis followed by brine disposal, ion exchange followed by brine disposal, mechanical evaporation sometimes followed by evaporation blowdown disposal, and chemical precipitation and solar ponds. In view of the sometimes high cost and general ineffectiveness of these methods and in further view of the large quantities of heat associated with cooling tower operation, it is a further object of this invention to beneficially utilize otherwise wasted heat energy in creating a more effective and economical means of removing dissolved solids from large quantities of water, even where that object is primary and without regard to waste heat rejection, such as, for example, the removal of certain chemical elements or compounds from sea water.

Other and still further objects, features and advantages of the present invention will become apparent from a reading of the following detailed description of a preferred form of the invention which is described in the context of its use in a wet cooling tower and which is taken in connection with the accompanying drawings in which:

The FIGURE is a diagramatic flow chart of the preferred form of the process of the present invention.

THEORY

The practice and study of unit operations in the art of chemical engineering comprise two operations which are often thought of and treated categorically. These are evaporation and crystallization—both involving the simultaneous transfer of heat and mass.

In evaporation operations, a solution is concentrated by evaporating the solvent. The concentration is continued until the solution becomes saturated and further until the solute precipitates as a crystalline solid. The operation is often called "crystallization".

The operation requires several rate processes. First, heat must be transferred from a heating medium to the solution. Second, mass and heat are simultaneously transferred when going from the liquid to the vapor phase. For a crystallization operation, there is also the simultaneous transfer of heat and mass between the solution and the solid phase.

To provide the appropriate background for the later discussion, it may be stated that the actual production of crystalline solids can be accomplished by methods ranging from those as simple as setting pans of hot concentrated solution out to cool to those as complex as continuous, carefully controlled, many-step processes tailored to provide a product of uniform particle size, shape, moisture content and purity.

For these latter and more efficient processes, crystallization equipment can be conveniently classified in terms of the method used to obtain deposition of particles, keeping in mind that crystal formation involves the two steps of crystal nucleation and then subsequent crystal growth. The degree of super-saturation of the solution is the driving force in both of these steps and is, therefore, the basic variable in the process of obtaining deposition. The processes are commonly classified as follows:

1. Super-saturation produced by cooling without substantial evaporation:
   a. Atmospheric cooling by natural convection
   b. Cooling by a liquid cooling medium absorbing heat through metal surfaces.
2. Super-saturation produced by evaporation without substantial cooling, where the heat to produce evaporation is transferred to the solution through metal surfaces. Examples: crystallizing evaporators, Crystal evaporator crystallizer.
3. Super-saturation produced by adiabatic cooling and evaporation.

Choice of equipment and method depends on the solubility-temperature relation of the substance to be crystallized. Solutes with a small positive temperature coefficient of solubility, or a negative coefficient, require super-saturation to be developed by evaporation.

Since the process of developing super-saturation by evaporation without substantial cooling is often carried out in equipment that has the physical characteristics of a simple evaporator, it is apparent through the discovery of this invention that an evaporative cooling tower and its inherent elements can perform as a crystallizing evaporator.

Acknowledging that there are known common characteristics in crystallizing evaporators and cooling towers, there is one important characteristic of a cooling tower which lends itself to operation as a crystallizing evaporator. As stated earlier, one of the required rate processes in a crystallizing operation is the transfer of heat from a heating medium to the solution. Under normal circumstances, the heat energy must be generated, but in the concept of the present invention, the heat energy is already present in the form of surplus or waste heat which is normally being thrown away. This surplus heat energy provides the heat necessary to propel the crystallization operation, in the form of evaporation without substantial cooling.

Unlike industrial crystallization operations where there is customarily a single solute to deal with, the medium of the cooling tower operation is likely composed of a number of different solutes, some perhaps having positive temperature coefficients of solubility while others have negative coefficients, such as calcium sulfate. These complexities suggest that methods of fractional crystallization may be utilized in the operation as well as the process of controlling crystallization by the addition of one or more other solvents, solutes or other substances.

In order to maximize the rate of formation of crystals, to create a more uniform chemical product, and to reduce the required level of super-saturation, the solutions within the cooling tower circuit are seeded with crystals of the dissolved solid material, a technique which is known in the art of crystallization.

The maximum degree of super-saturation is within the metastable zone. This avoids spontaneous nucleation and ensures that mechanical nucleation via seeding will be the dominant nucleation mode. Operating within the metastable zone ensures that crystal growth within the magma is the preferred site for solute desposition and reduces the potential for solute deposition on the physical surfaces of the system containing the circulating liquor.

PROCESS AND APPARATUS

FIG. 1 illustrates a form of the present invention as utilized in connection with a typical electric generating plant employing steam turbines. A mechanical-draft counter-flow cooling tower especially adapted for use in the inventive process is generally indicated by reference number 5b. It is understood that the tower 5b is one of several cooling towers in the system, the others being entirely conventional in their construction and operation. The cooling tower 5b is a vertically oriented structure having a fan 30 at the top to draw air in through the louvers 32 in the lower portion of the sides. The air moves vertically upward through the falling fluid which has been discharged through two sets of nozzles 6 and 43 comprising a distribution system. Above the distribution nozzles 6 are disposed a series of baffles 36 to reduce drift and consequent loss of water. A funnel-shaped basin 21a at the bottom of the tower collects the liquid after it has fallen through the tower.

The service water circulating in the conventional portion of the steam turbine condenser system is subjected to increasing concentrations of dissolved solids because of the evaporative loss of water, as discussed earlier. Normally, a portion of this circulating water would be bled off as blowdown water, but according to the present invention, a portion of the circulating service water is diverted through a conduit 15 into an isolated closed path, a portion of which comprises the special cooling tower 5b.

The remaining service water is directed by a conduit to a heat exchanger 11a disposed within the tower and from which the water is returned to the condenser system.

That portion of the service water which is diverted into the conduit 15 is circulated by a make up pump 37 into two paths, one leading to a zone 17 of seed and chemical preparation, and the other to a second system of distribution spray nozzles 43 positioned in the top of the tower 5b above the first mentioned set of nozzles 6.

The spray nozzles 43 introduce the make up water coming from the condenser into a closed circulating path comprising the cooling tower 5b and a crystallizer 42. The water from the spray nozzles 43 contains a substantial amount of dissolved solids and the object of the closed path circulation is to provide means by which the solids are made to crystallize out of the liquid and be mechanically removed therefrom. The first step in the crystallizing process is to bring the circulating liquid to a point of near super-saturation by passing it down through the cooling tower 5b and over the fill provided by the pipes of the heat exchanger 11a. As the liquid falls through the tower and evaporation takes place, the dissolved solids are concentrated to provide a condition of super-saturation, as described earlier. The heat energy supplied by the waste heat brought into the heat exchanger 11a maintains the level of temperature of the liquor in the cooling tower.

After passing through the tower, the super-saturated liquor is collected in a basin 21a and directed by a liquor circulating pump through a conduit 35a and upwardly through a crystallizer 42.

The crystallizer 42 is comprised of an elongated housing having a vertically disposed orientation and having a bottom inlet and a top discharge. Through injection from the seed and chemical preparation zone 17, the crystallizer contains a fluidized bed of crystals of the same solids which are dissolved in the cooling tower make up water. The crystal bed is kept in suspension by maintaining an adequate flow rate of the liquor being discharged from the circulation pump 24a.

Crystal growth occurs in the crystallizer 42 with the passage of the super-saturated liquor through the crystal bed, utilizing the presence of solute crystals to act as nuclei for the disposition of the percipitated solids. Within the crystal bed as dissolved solids are coming out of solution, a slurry or magma is formed and as the crystals within the slurry continue to grow their mass causes them to migrate to a lower level within the crystallizer where they are removed and mechanically separated by well known means 26 from the carrying liquid. Once the solids are thus removed, the separated liquor is returned to the bottom inlet of the crystallizer by a pump 29. The solids which have been separated are delivered to a holding facility and thence to disposal.

In the preferred form of the invention, the vertical orientation of the fluid flow path through the crystallizer tends to maintain the slurry in a fixed area or range within the crystallizer. This object is further enhanced by the enlargement of the diameter of the upper portion of the crystallizer housing which acts to reduce the flow rate there through. A slower rate of fluid flow produces a classifying effect on the crystals and allows the percipitated solids to fall out and remain within the slurry-occupying region of the crystallizer, resulting in a substantially clear liquor being decanted and removed from the discharge port at the top of the crystallizer 42 through a conduit 35b.

The passage of the super-saturated liquor through the crystal bed and the precipitation of dissolved solids out of the liquid substantially relieves the liquor of its super-saturated condition. It is then redirected through the cooling tower, together with make up water from nozzles 43, to again acquire a super-saturated condition for another pass through the crystallizer. The amount of heat and mass transfer performed on the circulating liquor each time it passes through cooling tower 56 is controlled by design and operation so as not to cause the degree of super-saturation in the circulating liquor to exceed a metastable concentration.

The seed and chemical preparation zone 17 is programmed and adjusted to furnish an optimum amount of new seed crystals or other required chemicals to properly maintain the crystal seed bed within the crystallizer, although it will be understood that the process is to a large degree self-perpetuating once an initial seed bed is established. Regardless of the selected level of seed and chemical injection from the zone 17, the make up water which passes through the zone furnishes part of the input to the closed path, as does the make up water coming directly into the cooling tower through the nozzles 43.

One of the primary advantages of isolating the precipitation and crystallizing phase of the process and confining it to the crystallizer is the decrease of fouling and scaling potential of the cooling tower by the presence of slurry throughout the whole closed path. An additional feature of the invention which minimizes fouling potential is the introduction of the unsaturated make up water to the closed path through the nozzles 43. The new water acts to wash and flush the drift baffles 36 and other elements of the tower construction as the water passes down through the tower.

I claim:

1. Apparatus for simultaneously rejecting industrial waste heat and for removing dissolved solids from water, comprising in combination:

means forming a first loop having an input for circulating water containing dissolved solids, including ambient air contact evaporator means and crystallizer means in series;

means introducing crystal nuclei into said first loop upstream from said crystallizer means for forming a magma within said crystallizer means;

decanting means included in said crystallizer means for decanting liquor from the mixed suspension of crystals and liquor;

separating means connected to a lower portion of said crystallizer means for separating crystalline solids from the magma therein contained;

means forming a second loop containing liquid of a higher temperature than the circulating water in the said first loop, and having a source of heat energy; and heat exchanger means between said first and second loop for transferring sensible heat to the circulating water in the first loop.

2. A process for simultaneously rejecting industrial waste heat and for removing dissolved solids from water comprising the steps of:

providing a first circulating flow of an aqueous solution of dissolved solids;

directly contacting said flow with a moving ambient air stream to cause evaporation from said flow, creating a condition of super-saturation of the solution;

providing a second loop flow of liquid having a higher temperature than that of the first circulating flow;

transferring heat energy from the second loop flow of liquid to the first circulating flow;

establishing crystal nucleation sites in the flow following the said evaporation;

relieving the condition of super-saturation in the flow by growing crystals in a magma;

diverting a portion of the magma from the flow and separating crystalline solids therefrom;

decanting liquor from the magma in the flow; and injecting into the flow additional solution of dissolved solids.

3. The process of claim 2 wherein the degree of super-saturation of the solution is limited to a metastable concentration.

4. The process of claim 2 wherein the heat energy added to the flow is added simultaneously with the contact with the moving air stream.

5. The process of claim 4 wherein the step of establishing crystal nucleation sites includes the injection of crystals into the flow.

* * * * *